United States Patent [19]
Patterson et al.

[11] Patent Number: 6,110,373
[45] Date of Patent: Aug. 29, 2000

[54] METHOD FOR SEPARATING HEAVY ISOTOPES OF HYDROGEN FROM WATER

[76] Inventors: James A. Patterson, 2074 20th St.; Martin Josef Gruber, 5227 Desoto Parkway, both of Sarasota, Fla. 34234; Louis Edward Furlong, 5770 Midnight Pass Rd., Sarasota, Fla. 34242

[21] Appl. No.: 09/093,459

[22] Filed: Jun. 8, 1998

Related U.S. Application Data

[63] Continuation-in-part of application No. 09/047,648, Mar. 25, 1998, abandoned.

[51] Int. Cl.$^7$ ........................................ C02F 1/28
[52] U.S. Cl. .......................... 210/638; 210/662; 210/663; 210/673
[58] Field of Search ..................... 210/638, 650, 210/662, 663, 96.2, 266, 315, 321.74, 321.8, 321.83, 321.89, 673; 521/26

[56] References Cited

U.S. PATENT DOCUMENTS 3,944,485  3/1976  Rembaum et al. ................ 210/684
4,976,866  12/1990  Grinstead et al. ................ 210/266
5,451,322  9/1995  Nelson et al. .................... 210/653

Primary Examiner—Ivars Cintins
Attorney, Agent, or Firm—Charles J. Prescott

[57] ABSTRACT

An apparatus and method for separating oxides of heavy isotopes of hydrogen (deuterium oxide, oxides of tritium and mixed isotope oxides) from light water (H2O) which is contaminated with these heavy hydrogen isotopes such as that currently being discharged in cooling water from nuclear power plants. A central aspect of this invention includes a plurality or bundle of elongated hollow core fibers which are positioned within an elongated enclosed housing having a feed water inlet, an exit stream outlet, and a permeate outlet. At least a portion of the hollow core fibers are at least partially filled or packed with small beads which are comprised of a porous exchange resin carrying waters of hydration. Porosity is controlled by the degree of cross-linking and bead diameter of the exchange resin which is preferably combined with aluminum sulfate or ammonium hydride to form $(RSO_3)_3Al$ or $RSO_3NH_4$. By passing the contaminated water through the bead-filled hollow core fibers within the housing, significant amounts of the oxides of heavy hydrogen isotopes remain in the hollow core fiber either combined with the resin beads or collected against the inside wall surfaces of the hollow core fibers. Some of the H2O in the contaminated water permeates out of the hollow core fibers for discharge from the permeate outlet. The water which discharges from the exit stream outlet is substantially lower in heavy hydrogen isotope content. Regeneration of the apparatus is also shown.

6 Claims, 16 Drawing Sheets

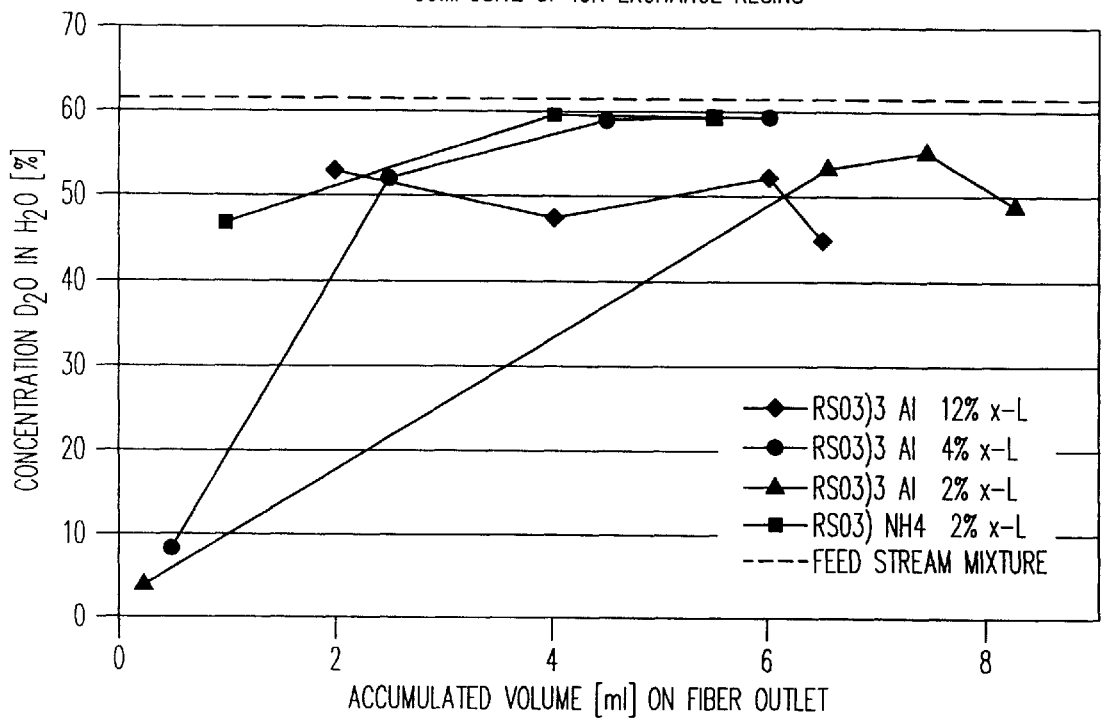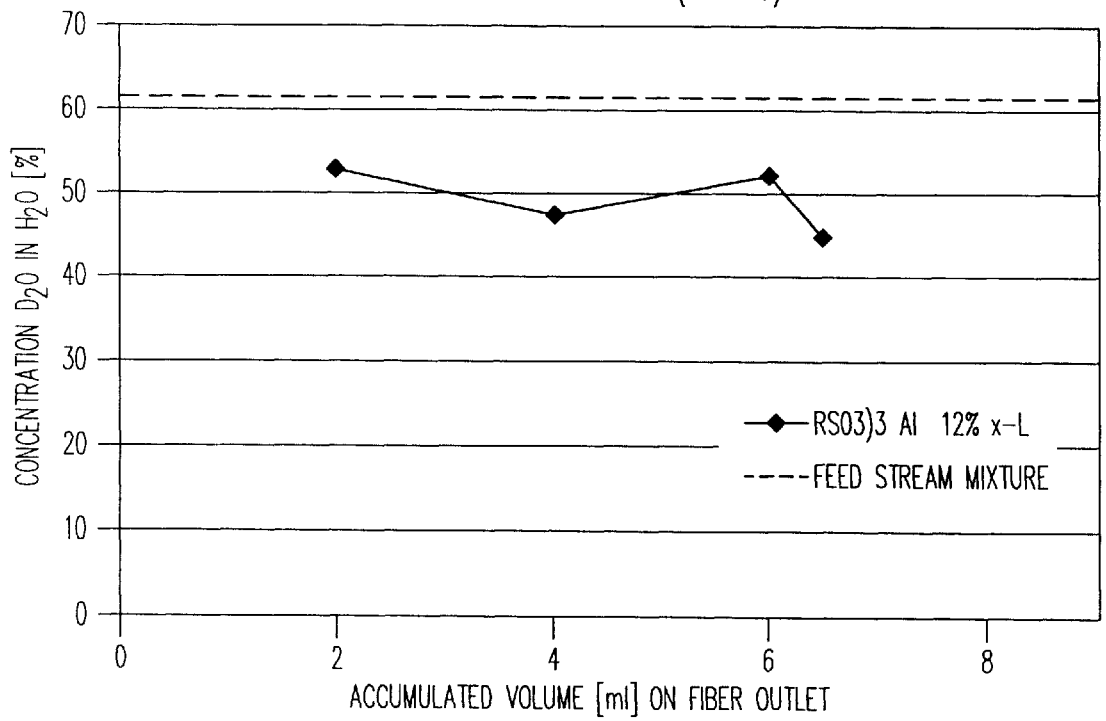

(PERMEATION)

ION EXCHANGE - MEMBRANE EXPERIMENT
USING A MODULE OF 32 COLUMNS AND 4.85% D2O FEED
FEED AND EXIT STREAM CONCENTRATIONS

ION EXCHANGE - MEMBRANE EXPERIMENT
USING A MODULE OF 32 COLUMNS AND 4.85% D2O FEED
FEED AND PERMEATE STREAM

METHOD FOR SEPARATING HEAVY ISOTOPES OF HYDROGEN FROM WATER

This is a continuation in part of U.S. application Ser. No. 09/047,648 filed Mar. 25, 1998, now abandoned.

BACKGROUND OF THE INVENTION

1. Scope of Invention

This invention relates generally to methods and apparatus for separating heavy isotopes of hydrogen, namely deuterium and tritium in their oxide form, from water which is contaminated with these heavy isotopes, and more particularly to an apparatus including the utilization of hollow core fiber filled with ion exchange beads as a separation medium.

2. Prior Art

Nuclear power plants must routinely deal with the replacement and disposal of contaminated water taken from the core reactor which is laden with heavy isotopes of hydrogen, namely deuterium oxides and tritium oxides. Tritium in particular is highly radioactive having a half life of about twelve and one half years emitting beta rays to form helium.

Periodically, the contaminated water from nuclear reactors must be replaced. It has become industry practice to dispose of the old contaminated water by simply dispersing it over adjacent ground areas. This is stressful to the environment as the deuterium oxides and tritium oxides are now known to have contaminated ground water sources. There appears to be no effective and economically practical means for otherwise disposing of this contaminated water so that this practice of ground disposal continues.

The present invention provides an economical alternative to ground disposal of contaminated water whereby the deuterium and tritium isotopes are held within lengths of hollow core fiber which have been filled or packed with ion exchange resin beads. Contaminated water is flowed through lengths of the filled hollow core fiber, substantially purified water discharging therefrom with the oxides of heavy isotopes of hydrogen being held or trapped within the hollow core fiber for appropriate disposal. Regeneration of the apparatus is also disclosed. This invention is equally useful for separating heavy isotopes of other smaller sized molecules such as those of oxygen and nitrogen.

BRIEF SUMMARY OF THE INVENTION

This invention is directed to an apparatus and method for separating heavy isotopes of hydrogen (deuterium and tritium in their oxide form) from water which is contaminated with these heavy hydrogen isotopes such as that currently being discharged from nuclear power plants. A central aspect of this invention includes a single elongated length or a bundle of hollow core fibers, each which is at least partially filled or packed with small beads which are comprised of a porous exchange resin. Porosity is controlled by the degree of cross-linking and bead diameter of the ion exchange resin which is preferably combined with aluminum sulfate or ammonium hydroxide to form $(RSO_3)_3Al$ or $RSO_3NH_4$ where R represents the cross linked polymer. By passing the contaminated water through the bead-filled hollow core fiber, significant amounts of the heavy hydrogen isotopes remain in the hollow core fiber for subsequent disposal, the water discharging from the exit end thereof being substantially lower in heavy hydrogen isotope content. The ion exchange beads in this invention function primarily through the exchange of waters of hydration. A method of regenerating the hollow core fiber bundle is provided, along with multi-component commercial systems.

It is therefore an object of this invention to provide an environmentally safe alternative to the ground dispersion of water contaminated with heavy isotopes of hydrogen.

It is yet another object of this invention to provide means for separating heavy isotopes of hydrogen from light water (H2O).

It is still another object of this invention to provide a commercially viable apparatus containing a bundle of filled hollow core fiber lengths in a housing for separating heavy isotopes of hydrogen, including tritium, from contaminated water and a method for regenerating said apparatus.

In accordance with these and other objects which will become apparent hereinafter, the instant invention will now be described with reference to the accompanying drawings.

BRIEF DESCRIPTION OF THE DRAWINGS

FIG. 2 is a graphic summary or composite of the effectiveness of the invention in reducing the deuterium oxide level in contaminated water.

FIG. 3 is a graphic presentation of one of the performance curves of FIG. 2 for 12% cross linked (X-L) ion exchange resin loaded with aluminum.

DETAILED DESCRIPTION OF THE INVENTION

Figure 1:
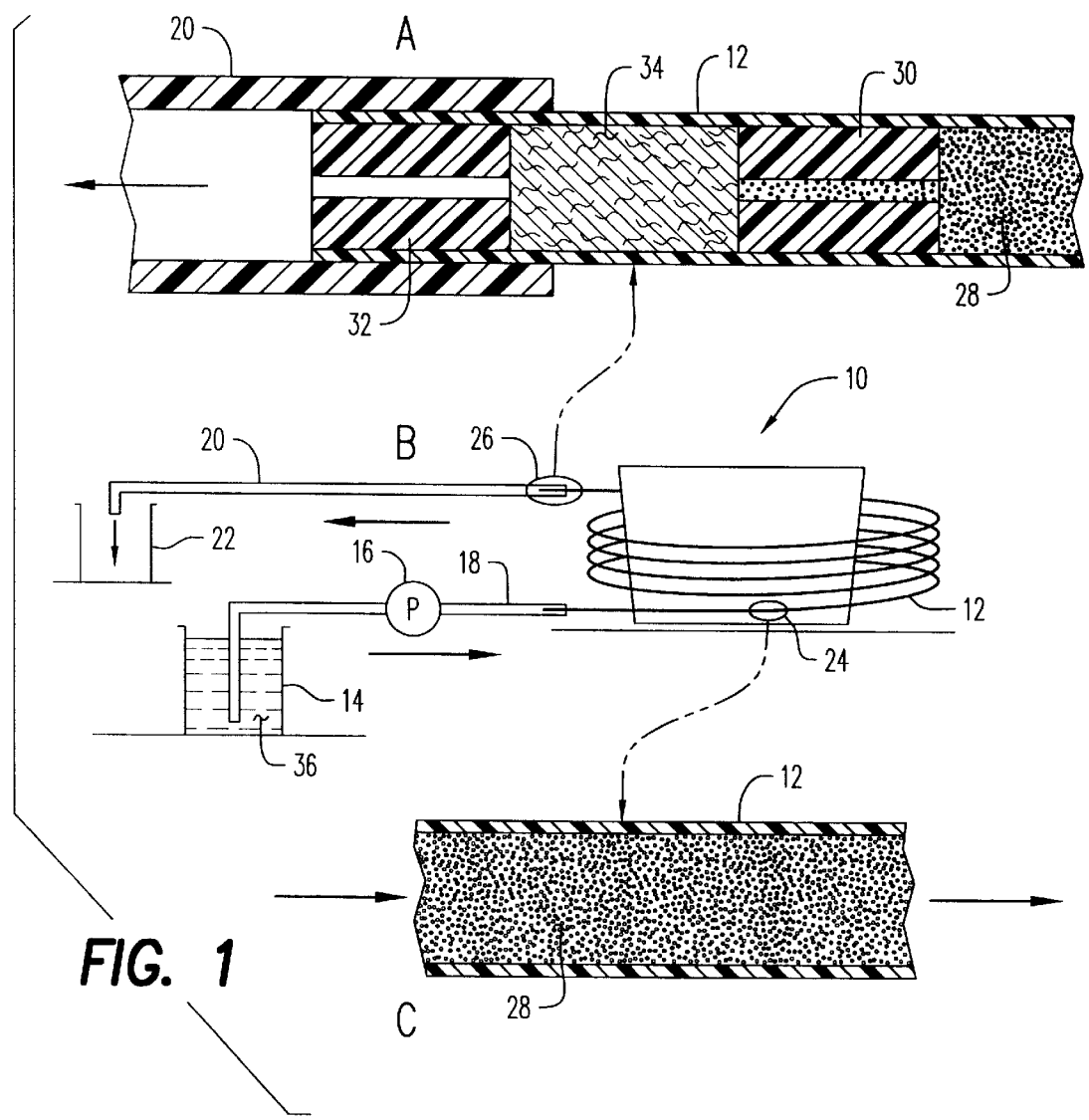
FIG. 1 is a simplified schematic view of the apparatus 10 shown in FIG. 1B, enlargements of portions thereof shown in FIGS. 1A and 1C.
Figure 4:
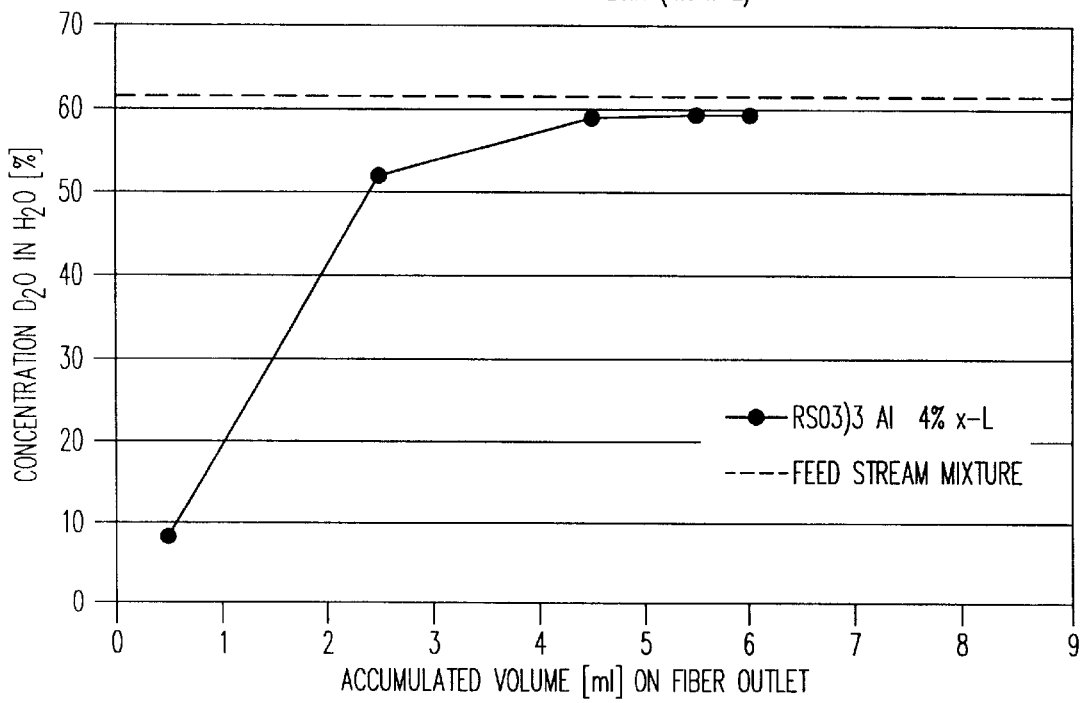
FIG. 4 is a graphic presentation of another of the performance curves of FIG. 2 for 4% cross linked ion exchange resin loaded with aluminum.
Figure 5:
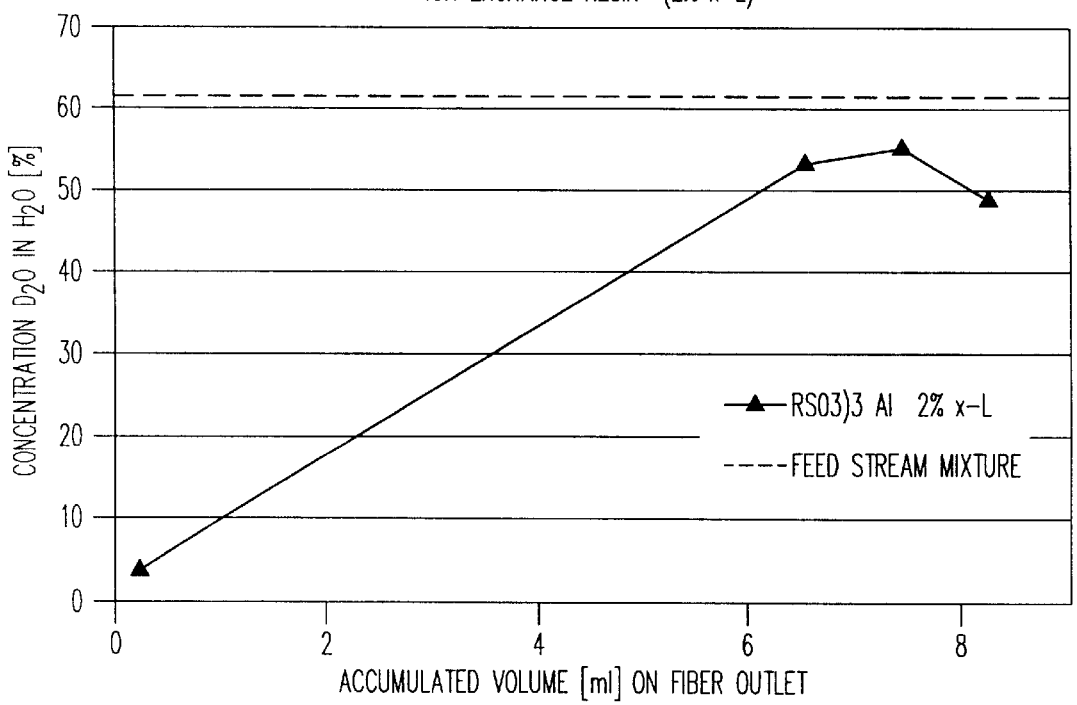
FIG. 5 is a graphic presentation of yet another of the performance curves of FIG. 2 for 2% cross linked ion exchange resin loaded with aluminum.
Figure 6:
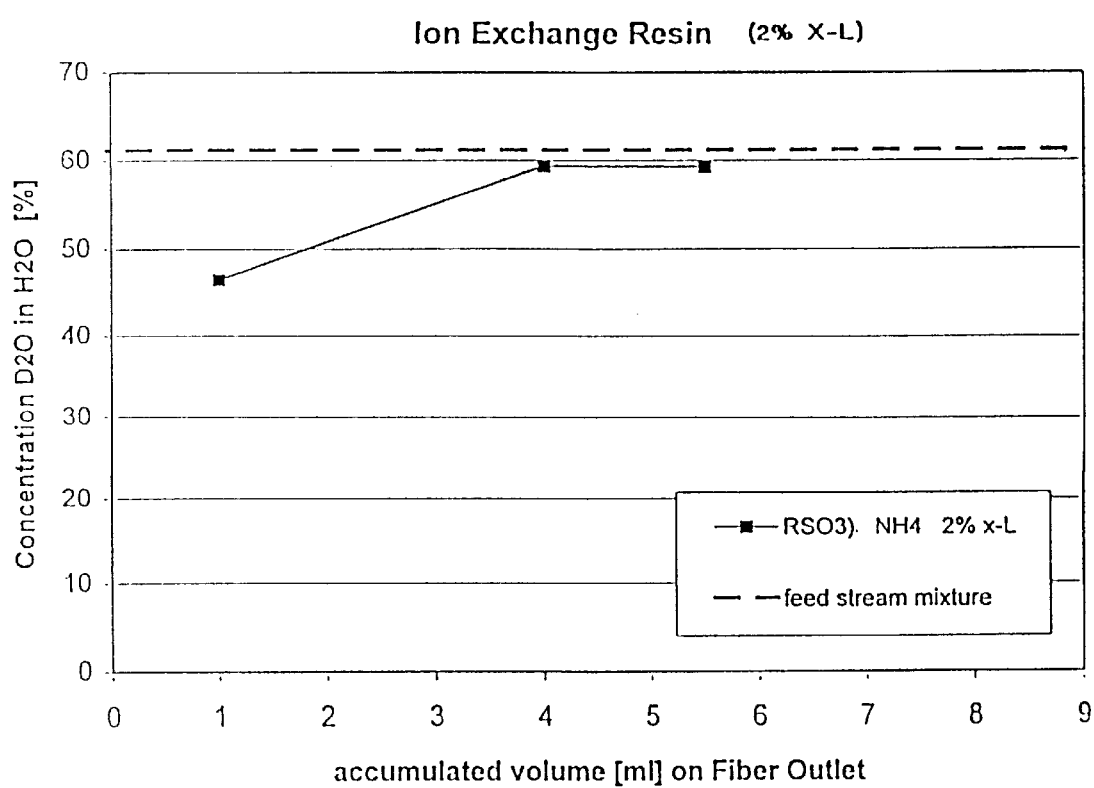
FIG. 6 is a graphic presentation of still another of the performance curves of FIG. 2 for 2% cross linked ion exchange resin loaded with ammonia.

Referring now to the drawings, the apparatus is shown generally at numeral 10 at FIG. 1B and includes a length or coil of hollow core fiber 12 which is formed of cellulose acetate and is otherwise well known in the industry. The particular features of this hollow core fiber 12 used in the experiments reported below are an inside diameter of 1.3 mm (range of 1–3 mm), a wall thickness of 0.2 mm (range of 0.05 to 0.20 mm), an outside diameter of 1.7 mm, and a density of 1.20 g/cm³.

An inlet end of the hollow core fiber length 12 is connected to a plastic feed line 18 leading to a tank 14 filled with water contaminated with heavy isotopes of hydrogen, namely deuterium oxide. This contaminated water 36 is pumped in the direction of the arrow by pump 16 through connecting plastic tubing 18 into the hollow core fiber length 12. Radioactive tritium is unavailable for routine, unregulated use, but because the tritium oxide molecule is much larger than both hydrogen oxide and deuterium oxide, the results reported herebelow for deuterium oxide separation apply at least equally well for tritium separation.

It should be noted that other water permeable membranes may be utilized, the requirement being having a pore size and molecular composition sufficient to substantially allow permeation of H2O therethrough while substantially preventing permeation of heavy isotopes of water, namely deuterium and tritium in their oxide forms.

The hollow core fiber 12 as best seen in FIG. 1C is filled or packed with separate beads 28 which are formed form an ion exchange resin as described herebelow. The outlet end of the hollow core fiber length 12 is connected to a length of plastic tubing 20 which discharges the processed and purified water into a separate container 22 as it flows from the hollow core fiber 12.

To prevent the exchange beads 28 from being forced out of the hollow core fiber length 12, a filter or trap is connected at the discharge end thereof as shown in FIG. 1A, an enlargement of area 26 of FIG. 1B. Two spaced apart plastic tubes 30 and 32 each having a small longitudinal aperture centrally therethrough, are positioned within the outlet end of the hollow core fiber length 12. These plastic tubes 30 and 32 are spaced apart by a quantity of packed cotton 34 so that none of the exchange beads 28 will flow beyond plastic tubing member 30, yet without substantially restricting the flow of processed water flowing out of the hollow fiber core length 12 into tube 20 in the direction of the arrow.

EXCHANGE RESIN BEADS

Details of the content and method of producing the ion exchange beads formed of cross linked styrene divinyl benzene polymer are disclosed in detail in Patterson's earlier U.S. Pat. No. 5,036,031 which is incorporated herein by reference.

LOADING PROCEDURE FOR ION EXCHANGE RESIN BEADS

The procedure described herebelow was used to load cross-linked ion exchange beads with aluminum. The procedure was applied for R $SO_3H$ with 2%, 4% and 12% cross-linking, 60 mesh, 100–200 mesh and 200–400 mesh screened for size.

Pretreat Beads

The beads were first cleaned with hydrochloric acid (2% HCl) to take out all residual cations. Ion exchange with HCl will take out Al and other metal ions which were on the beads as shown by the formula:

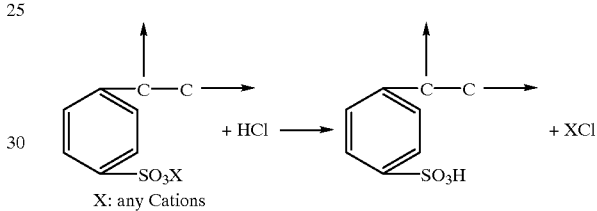

X: any Cations

The beads are then rinsed with D.I. water until the pH returns to 5–6. This will remove the XCl.

Load Beads with Al

Prepare a solution of $Al_2(SO_4)_3$ and, preferably warmed D.I water. Apply this solution to the beads to produce this reaction:

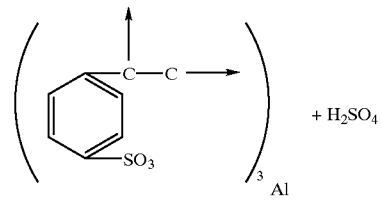

Rinse the loaded beads with D.I. water until the pH returns to 5–6. The beads were initially treated prior to loading into the hollow core fiber.

After the ion exchange beads 28 were pretreated as above described, the hollow core fiber length 12 was loaded therewith. The loaded hollow core fiber length 12 was dried in an oven at approximately 50° C. for three days in order to drive out all residual water. Three separate lengths of hollow core fiber 12 were then filled with a prepared mixture of light water ($H_2O$) and deuterium oxide in a ratio of approximately 61% $D_2O$ by volume which was taken from a supply bottle used for the entire experiment to insure consistency. The pump rate of the deuterium oxide contaminated water was set at 2 ml per hour using a constant rate high pressure pump 16.

The affluent discharging into container 22 was then analyzed. This affluent was split into separate samples taken at specific time periods from the start of each experiment. These time spaced samples were taken to provide an indication of the variability of the separation capability of the apparatus 10 over time. The test data taken is shown in Table I herebelow.

may be regenerated without the need for removal of the resin from the hollow core fibers.

Figure 7:
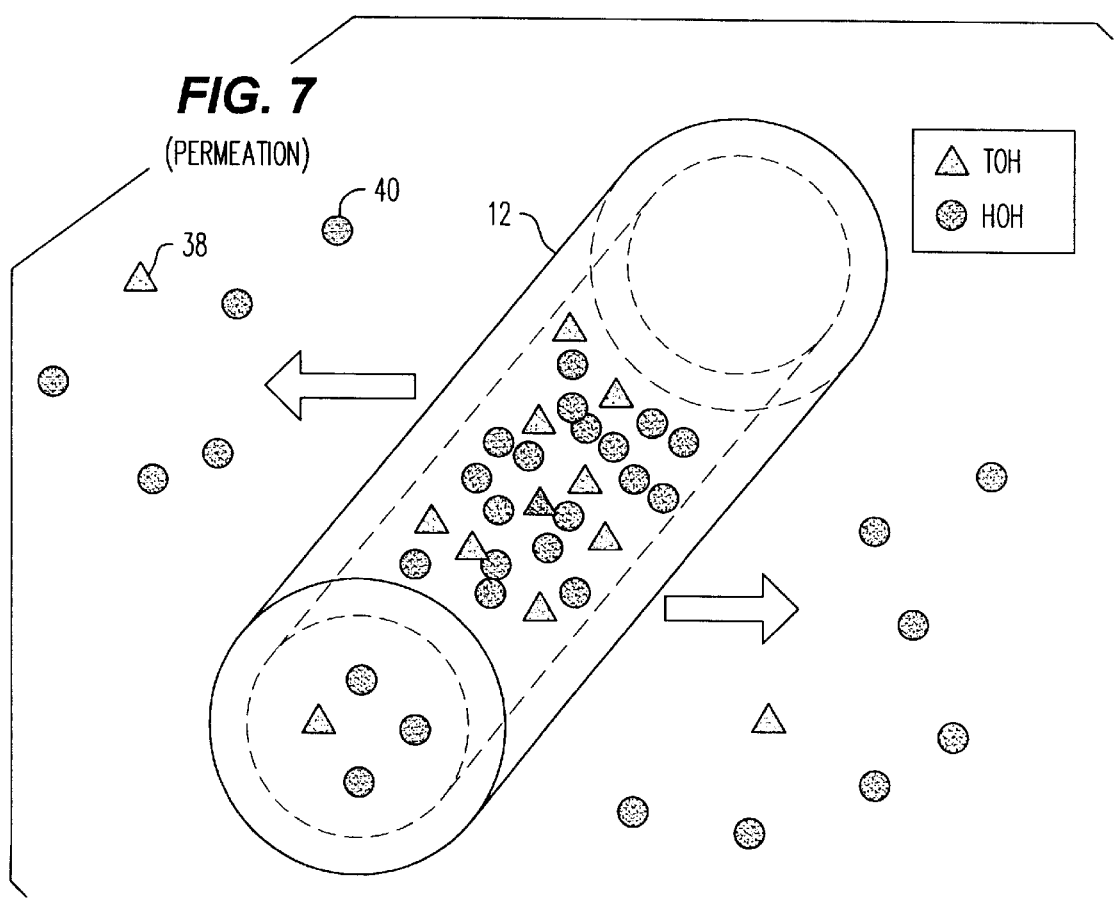
FIG. 7 is a perspective schematic view depicting one aspect of the tritium and deuterium oxide separation process of the present invention, that being permeation through the walls of the hollow core fiber.

Referring now to FIG. 7, a pictorial view of a section of hollow core fiber 12 is there shown as previously described. Water molecules HOH depicted as circled at 40 permeate

TABLE I

HOLLOW CORE FIBER PACKED
WITH ION EXCHANGE RESIN BEADS

| ION EXCHANGE RESIN | VOLUME OF AFFLUENT (ml) | ELAPSED TIME (HRS) | FREEZING POINT (C) | CORRES. % OF $H_2O$ | ACCUM. VOL. (ml) |
|---|---|---|---|---|---|
| $(RSO_3)_3Al$ (12% x-L) | 2 | 1 | 2.011 | 52.64 | 2 |
| " | 2 | 2 | 1.801 | 47.15 | 4 |
| " | 2 | 3 | 1.983 | 51.91 | 6 |
| " | 0.5 | 3¼ | 1.701 | 44.53 | 6.5 |
| $(RSO_3)_3Al$ (4% x-L) | 0.5 | 2 | 0.312 | 8.17 | 0.5 |
| " | 2 | 3 | 1.979 | 51.81 | 2.5 |
| " | 2 | 4 | 2.248 | 58.85 | 4.5 |
| " | 1 | 5 | 2.255 | 59.03 | 5.5 |
| " | 0.5 | 5¼ | 2.254 | 59.01 | 6 |
| $(RSO_3)_3Al$ (2% x-L) | 0.25 | 2 | 0.148 | 3.87 | 0.25 |
| " | 6.3 | 5 | 2.028 | 53.09 | 6.55 |
| " | 0.9 | 5½ | 2.101 | 55.00 | 7.45 |
| " | .8 | 6 | 1.856 | 48.59 | 8.25 |
| $(RSO_3)NH_4$ (2% x-L) | 1 | 2 | 1.777 | 46.52 | 1 |
| " | 3 | 4 | 2.267 | 59.35 | 4 |
| " | 1.5 | 5 | 2.264 | 59.27 | 5.5 |

GRAPHIC DISPLAY OF DATA

This test data is also shown graphically in FIGS. 2 to 6. FIG. 2 is a composite of all of the performance data taken, while FIGS. 3 to 6 graphically depict the performance or separation capability of each of the ion exchange resins utilized in these experiments. Again, the contaminated test water was all taken from a common prepared source.

The concentration of deuterium oxide is depicted as a volumetric percentage of the total affluent sample volume and is determined by carefully establishing the freezing point of each sample. The freezing point of pure light water is 0.0° C. while the freezing point of pure deuterium oxide ($D_2O$) is 3.82° C. The freezing point measurements were taken utilizing an Advanced Instruments Osmometer, Model 5600. The conversion from freezing point to percent deuterium oxide is assumed to be a linear relationship.

In reviewing these graphic performance data shown in FIGS. 2 to 6, the 2% cross-linked sample with aluminum showed the greatest change or decrease in the deuterium oxide level from 61% by volume down to less than 4% deuterium oxide concentration in the first sample taken after two hours of system operation. Note that with respect to both the 2% and 4% cross-linked exchange resin combined with aluminum, after three to five hours of operation, the second and subsequent samples taken demonstrate substantially higher concentrations of deuterium oxide, indicating that the apparatus is most effective in removing deuterium oxide (and presumably oxides of tritium) from the contaminated water within the first period of operation.

COMBINED EXCHANGE-MEMBRANE SEPARATION

The separation of isotopes and molecules as above described is affected by the combination of the process of selective absorption on a resin and the selective permeation through the walls of the hollow core fiber membrane. The resin particles or beads as above-described are contained within the hollow core fibers and, of particular importance, through the hollow core fiber wall faster than do the tritium oxide (TOH) molecules shown as triangles at 38. A substantially higher number of water molecules 40 permeate outwardly through the hollow core fiber wall than do the larger tritium oxide molecules 38.

Figure 8:
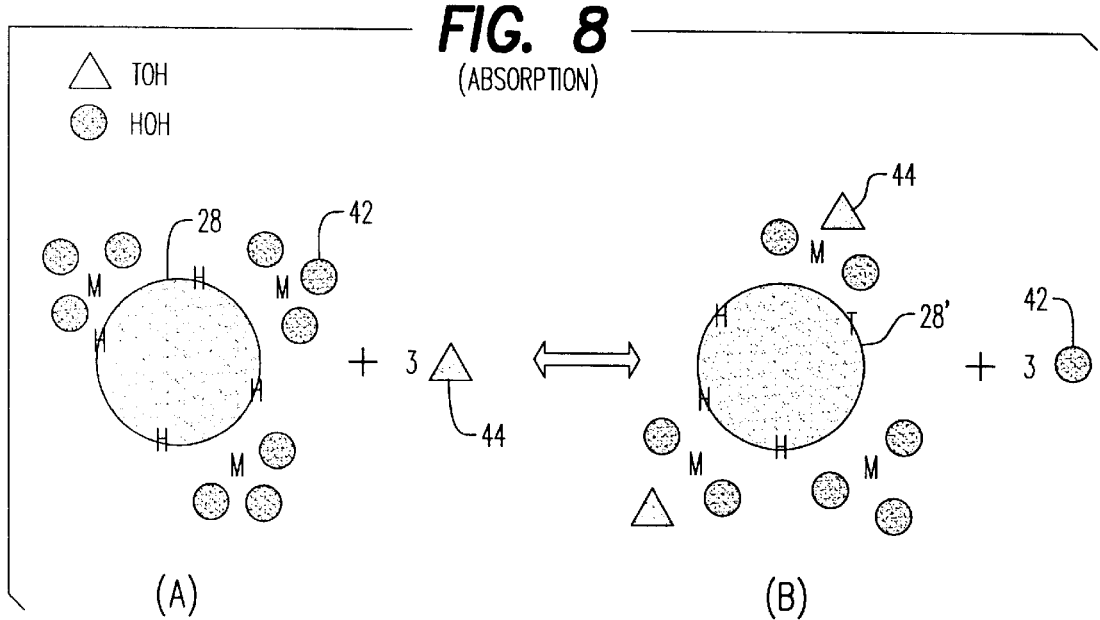
FIG. 8 is a simplified schematic view of a second aspect of the invention depicting an ion exchange resin particle exchanging atoms with the contaminated water, FIG. 8A depicting the precondition to exchange, FIG. 8B depicting the post exchange molecular arrangement.

In FIG. 8, the absorption aspect of the present invention is there depicted as a second separation agent. Each of the above described resin beads or particles 28 shown in FIG. 8A include metal sites M having associated waters of hydration 42. Each resin particle also contains hydrogen H as an essential aspect of these polymer resins. When the tritium oxide molecules 44 are combined with the resin molecules 28, the absorption results are shown in FIG. 8B. In the examples shown, three tritium oxide molecules 44 are absorbed into the resin particles 28' and three water molecules 42 are released therefrom.

Figure 9:
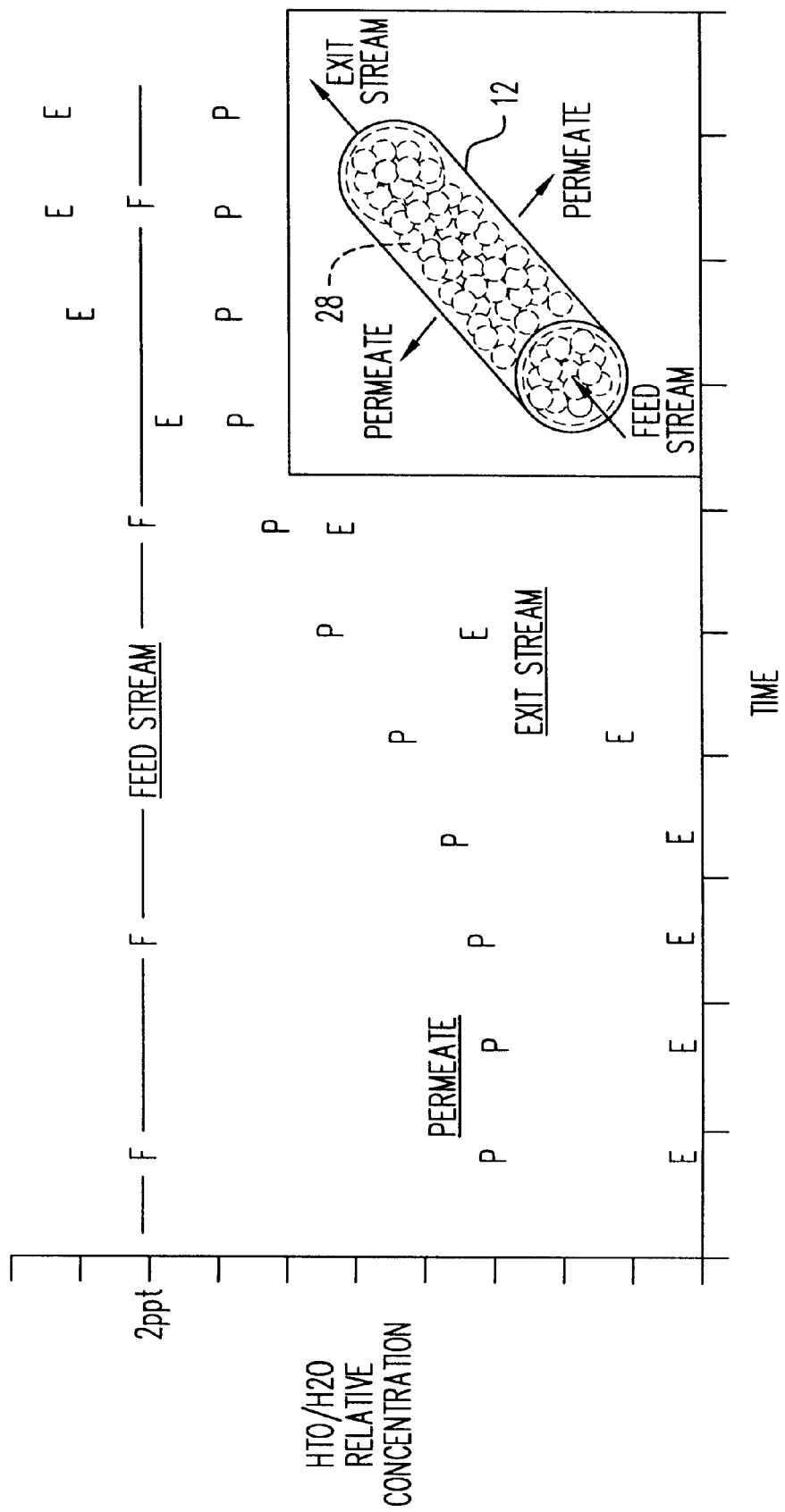
FIG. 9 is a simplified example of a typical set of water contaminate absorption curves with respect to both contaminant separation aspects or mechanisms of the present invention.

Test performance results may be generalized as shown in FIG. 9. A section of resin filled hollow core fiber 12 is shown in the insert of this graph for reference. The feed stream flows into one end while the exit stream flows out of the other end of the hollow core fiber 12 as shown. The permeate passing through the hollow core fiber walls is also shown. The feed stream has an initial and constant concentration of tritium oxide as shown by the symbols F. The typical level of tritium oxide in the permeate is shown by the letter P over time, while the concentration level of tritium oxide in the exit stream over time is shown by the letters E. Note that the tritium oxide level in the permeate P does not raise or increase to the concentration level of the feed stream F but, at some point in time, the exit stream tritium oxide concentration E exceeds that of the feed stream F. This is likely due to the fact that the resin beads 28 initially absorb and hold a high level of tritium oxide, but eventually become saturated.

Figure 10:
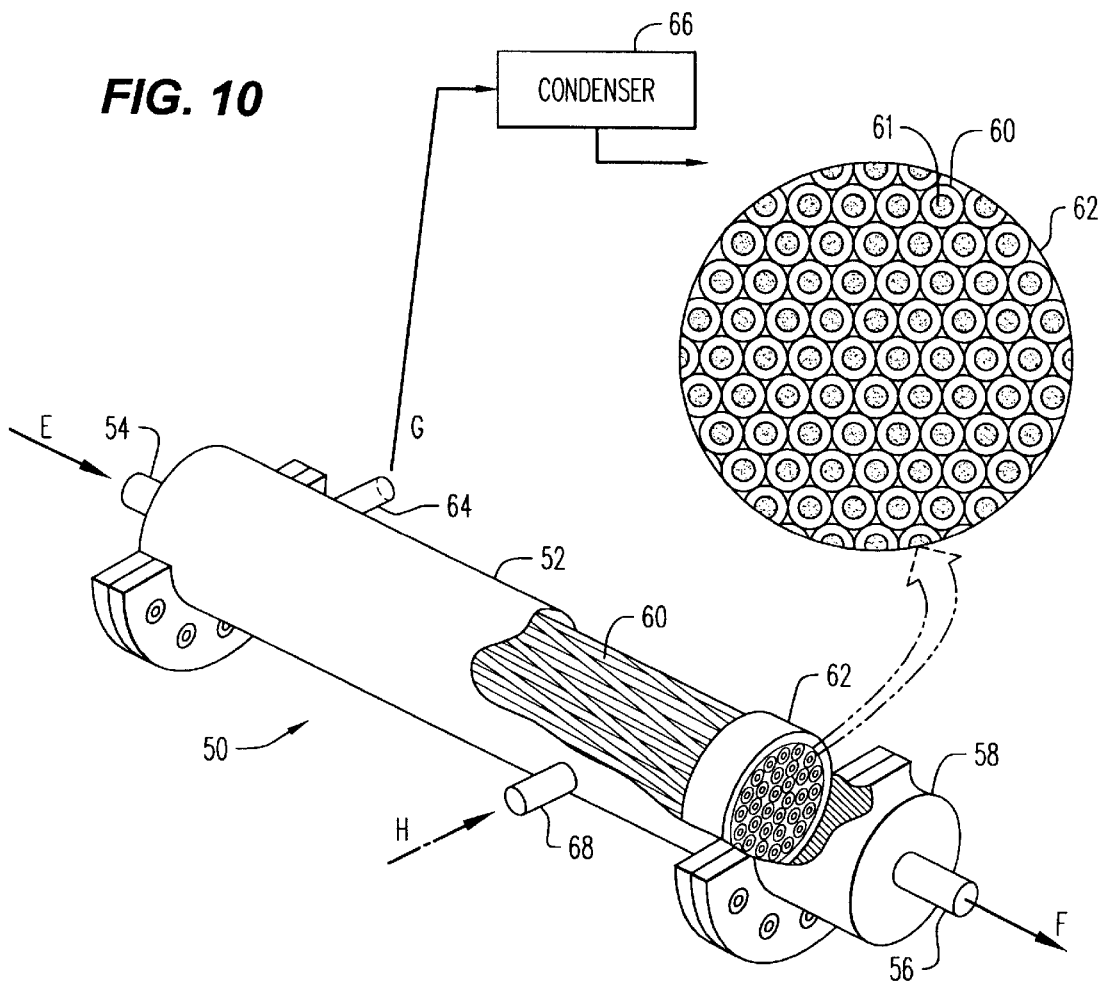
FIG. 10 is a simplified perspective view of one commercial embodiment of the invention.

A commercially viable embodiment of the invention is shown generally at numeral 50 in FIG. 10. This commercial module 50 includes an elongated tubular housing 52 having a header 58 sealingly connected at each end thereof which supports an inlet tube 54 and an outlet tube 56, respectively.

Positioned within the housing 52 is a bundle of elongated hollow core fibers 60, each of which is filled with ion exchange resin beads as previously described. This bundle of hollow core fibers 60 is held together by header 62 at each end thereof and positioned within housing 52. The feed stream enters the device 50 at inlet 54 in the direction of arrow E, while the exit stream flows into the direction of arrow F from outlet 56. Headers 62 insure that all of the feed stream liquid flows through and not outside of the hollow core fiber members 60. Separately, permeate flows from permeate outlet 64 in the direction of arrow G to a condenser 66.

The experimental test results reported herebelow utilize this experimental module in developing the data shown in FIGS. 11 to 14. The test module 50 includes thirty two such hollow core fibers 60 filled with ion exchange resin particles 61. Each of the fibers were eight feet in length. The feed stream had a $D_2O$ concentration of 4.85 percent by weight within water. The experimental results are described more fully herebelow.

Still referring to FIG. 10, the apparatus 50 may be regenerated when the ion exchange resin bead 61 packed within each hollow core fiber member 60 becomes saturated as previously described in FIG. 9. Saturation may be determined by sensing the D2O and/or the TOH concentrations in the exit stream. To regenerate the resin, the feed stream is interrupted and, preferably, the apparatus 50 is emptied of fluid. Thereafter, a stream of hot air is forced into inlet 68 in the direction of arrow H. Inlet 54 and outlet 56 are closed during this regeneration process so that the heated air (at approx. 70° C., for example) would be fed into housing 52 through inlet 68. The heat releases waters of hydration TOH and H2O. When the humidity of the heated air exiting the housing 52 at outlet 64 reaches a predetermined humidity level, the exit gas would flow to a separate high capacity condenser (not shown in FIG. 10) to condense the maximum amount of water from this exit airstream.

Figure 11:
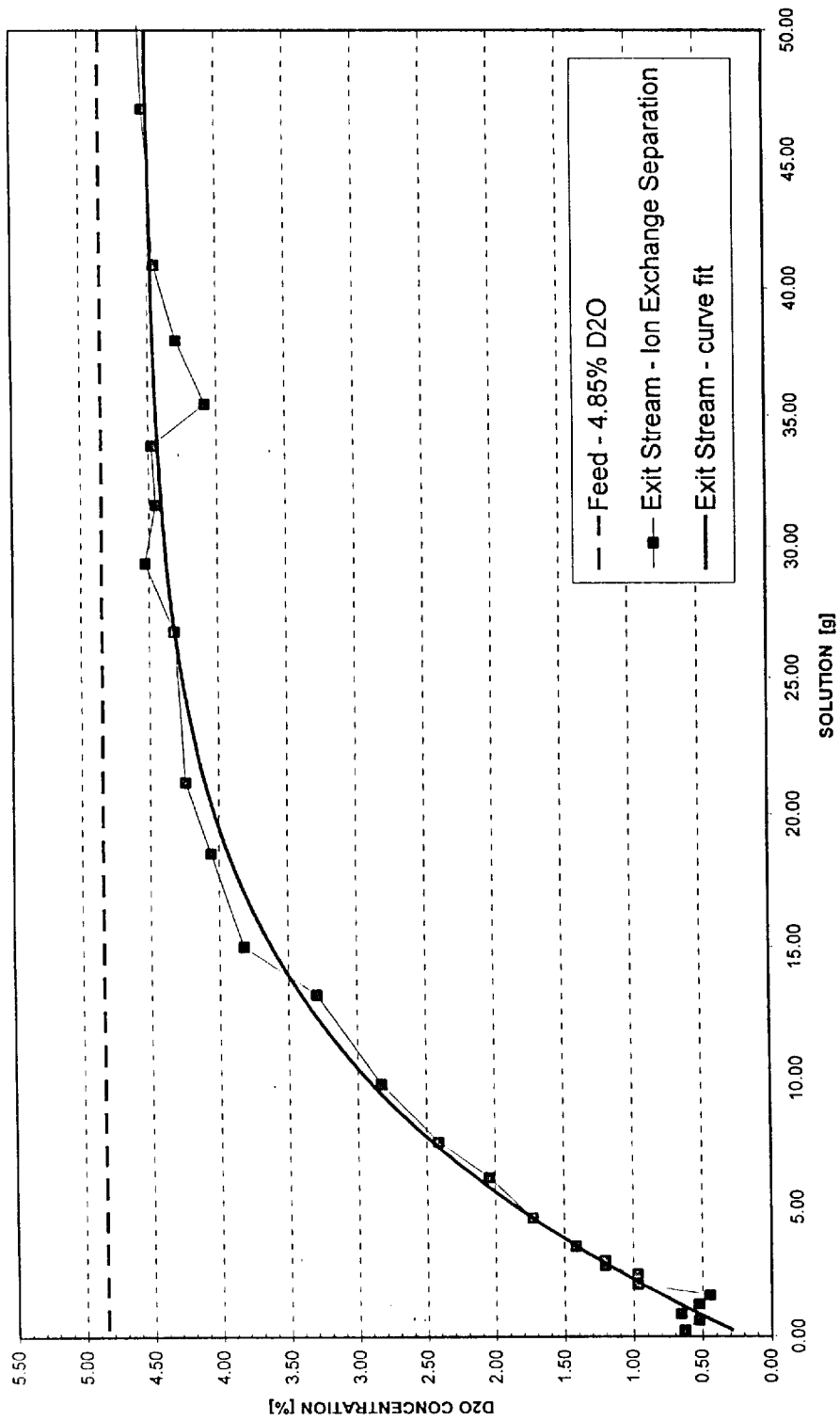
FIG. 11 is a graphic presentation of the test performance of a prototype apparatus similar to the embodiment of the invention shown in FIG. 10 showing a graphic comparison between the feed and exit stream concentrations of $D_2O$ contaminated water.
Figure 12:
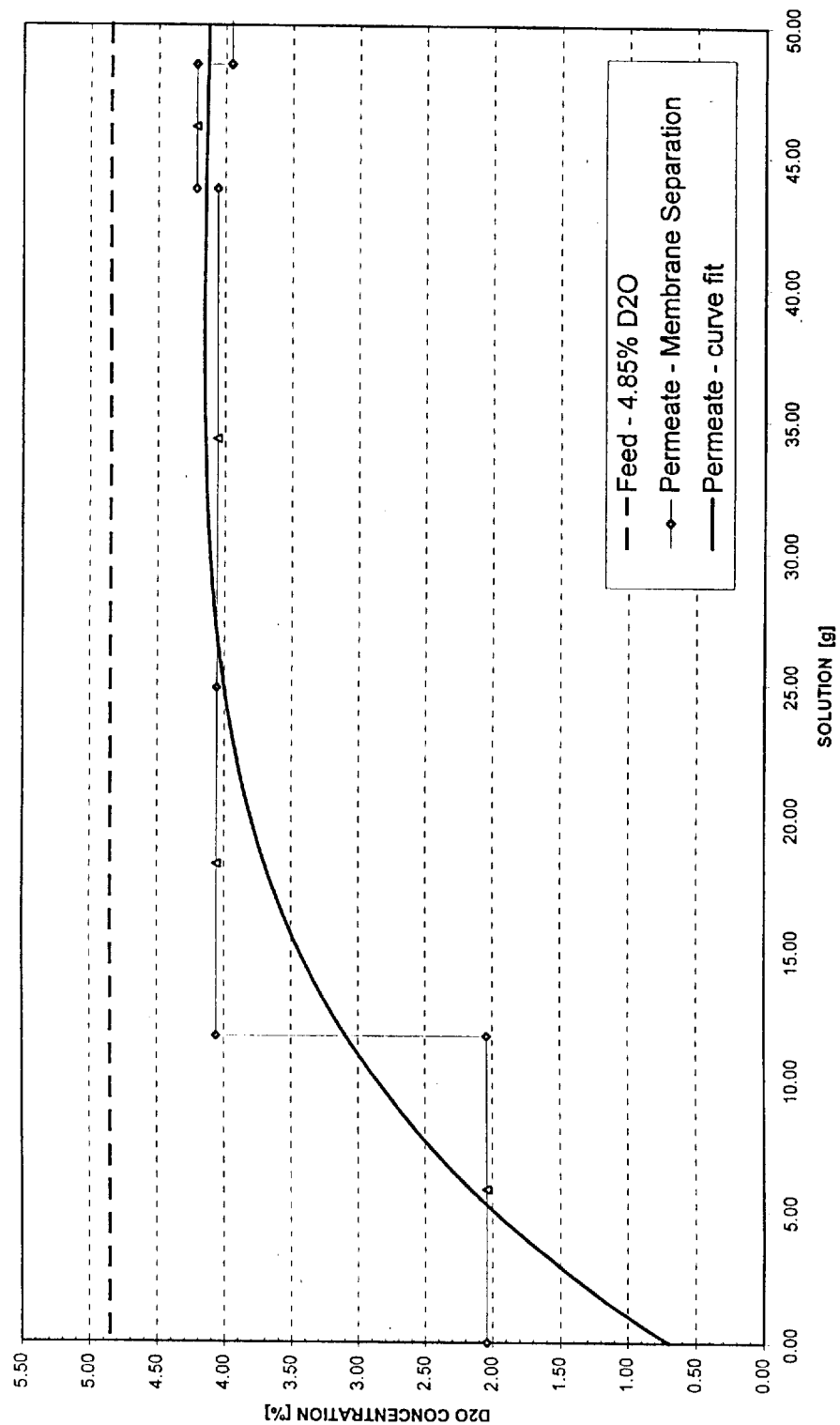
FIG. 12 is a graphic presentation of the test performance of a prototype apparatus similar to the embodiment of the invention shown in FIG. 10 showing a graphic comparison between the feed and permeate stream concentrations of $D_2O$ contaminated water.

Referring now to FIGS. 11 and 12, the above described module 50, having thirty two columns of hollow core fiber members 60 longitudinally arranged and packed therein, were test run utilizing a feed stream of light water contaminated with 4.85% D2O by weight. The D2O concentration of the exit stream was monitored and is shown in FIG. 11 with respect to the exit stream flow shown by weight (g) over time.

In FIG. 12, during the same experiment, the concentration of the permeate as a function of total permeate flow by weight (g) is there shown. With respect to both the exit stream and the permeate, the D2O concentrations were initially very low indicating a very high efficiency in D2O separation from water which gradually decreased over time.

Figure 13:
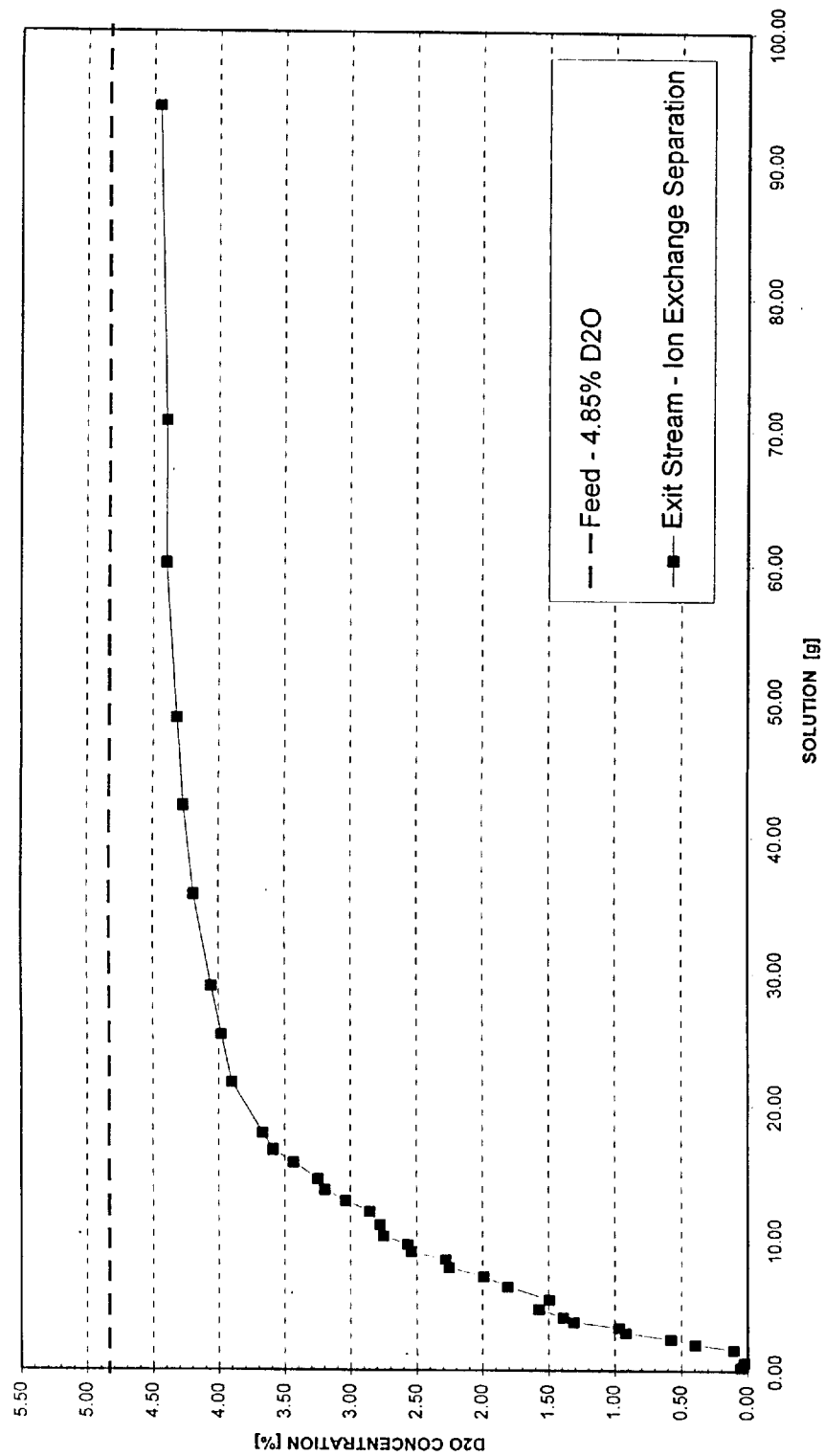
FIG. 13 is a graphic presentation of the test performance of a prototype apparatus similar to the embodiment of the invention shown in FIG. 10 showing a graphic comparison between the feed and exit stream concentrations of $D_2O$ contaminated water during a second test run after regeneration.
Figure 14:
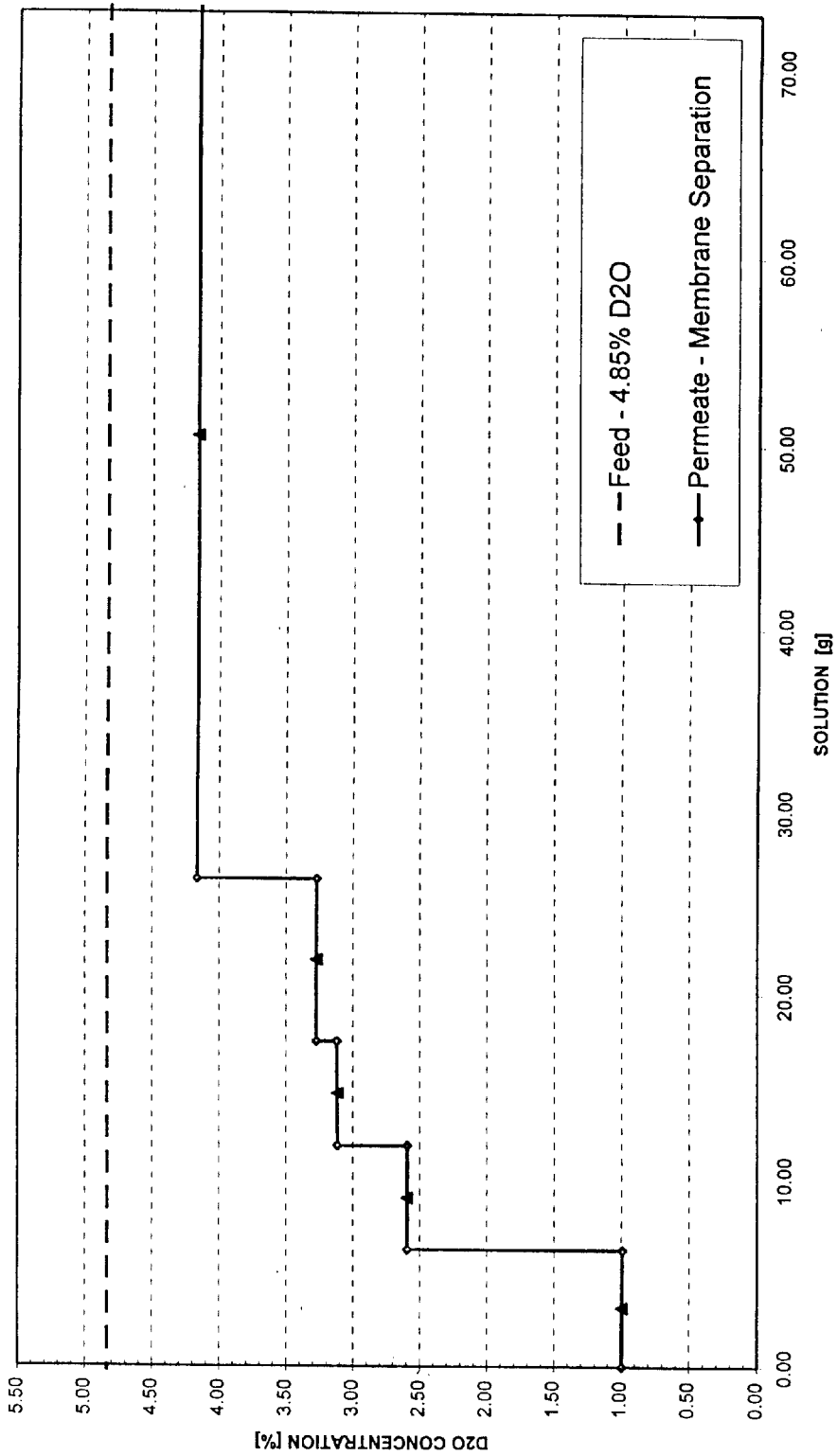
FIG. 14 is a graphic presentation of the test performance of a prototype apparatus similar to the embodiment of the invention shown in FIG. 10 showing a graphic comparison between the feed and permeate stream concentrations of $D_2O$ contaminated water during a second test run after regeneration.

Referring now to FIGS. 13 and 14, the same experiment utilizing the same module 50 having thirty two columns of hollow core fiber members filled with the same ion exchange resin was retested. Prior to this retest, the airflow regeneration process above described was completed.

In comparing the test results of the first run to the second run after regeneration, it is noted that, with respect to the exit stream concentrations shown in FIGS. 11 and 13, the greatest reduction in $D_2O$ was 90% on the first run, increasing to virtually 100% in the second run after regeneration. Likewise, comparing FIGS. 12 and 14, the permeate concentration on the first run showed a maximum near test onset of 55%, increasing to above 60% D2O reduction in the initial sampling after regeneration.

COMMERCIAL SYSTEM

Figure 15:
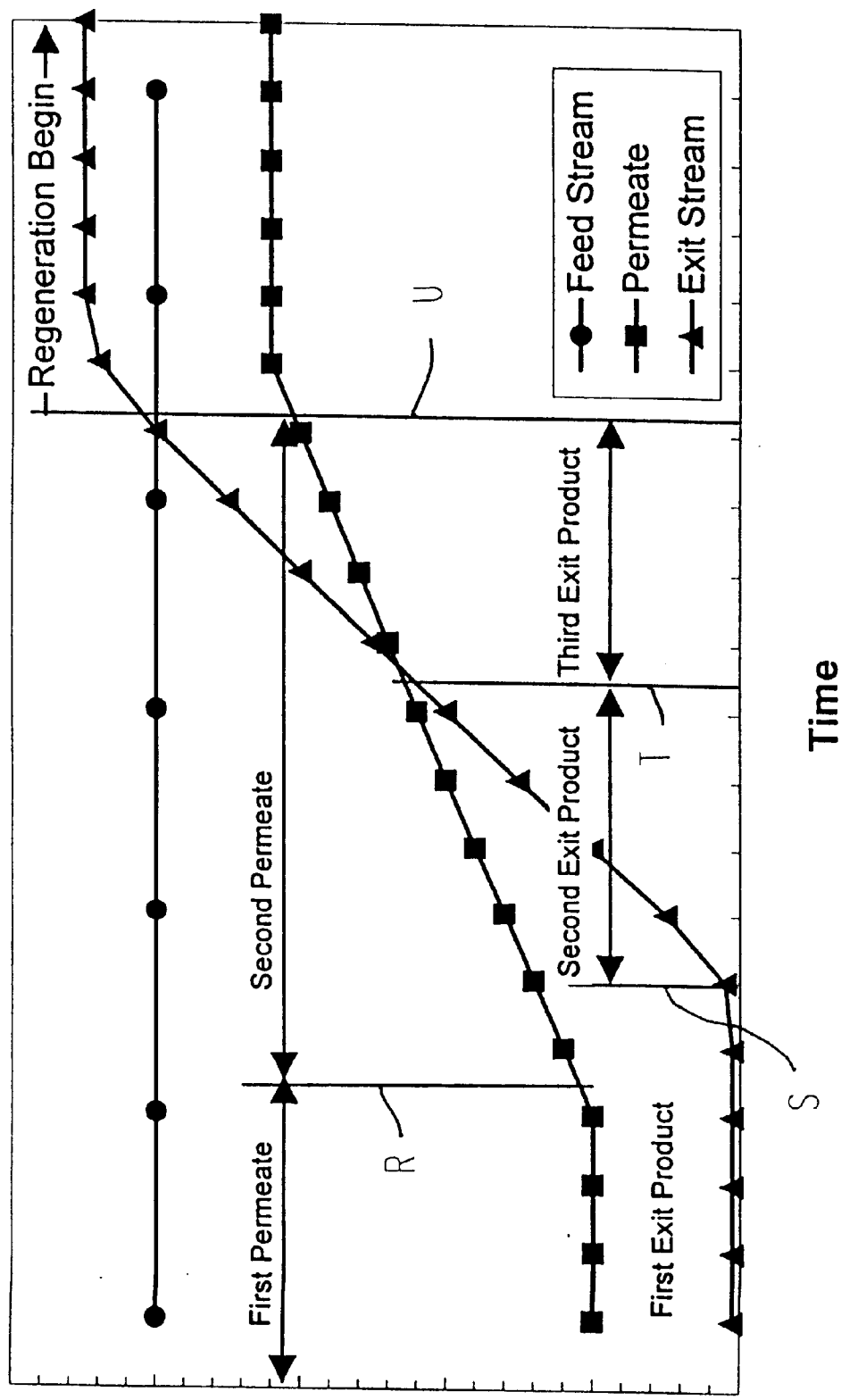
FIG. 15 is a graphic presentation of a typical set of performance curves of the invention depicting the various stages of performance effectiveness of both the exit stream and the permeate.

To commercialize the present invention, it is useful to divide the separation performance curves with respect to both the exit stream and permeate into sections or segments as shown in FIG. 15. With respect to the exit stream, the first exit product with the highest reduction in heavy water concentration ends at time S. Second exit product and third exit product stages end at times T and U, respectively. After time U, it is recommended that each module be taken out of service and regenerated as above described.

With respect to the permeate, there is also a high efficiency time period ending at time R during which the contaminant reduction is at a maximum. During the second permeate stage between time R and U, the decrease in contaminate removal is generally steady and of a very useful nature. Obviously, although the permeate would continue to be at a contaminate level below that of the feed stream, the module should be regenerated because the exit stream would then contain a higher contamination level than that of the feed stream.

Figure 16:
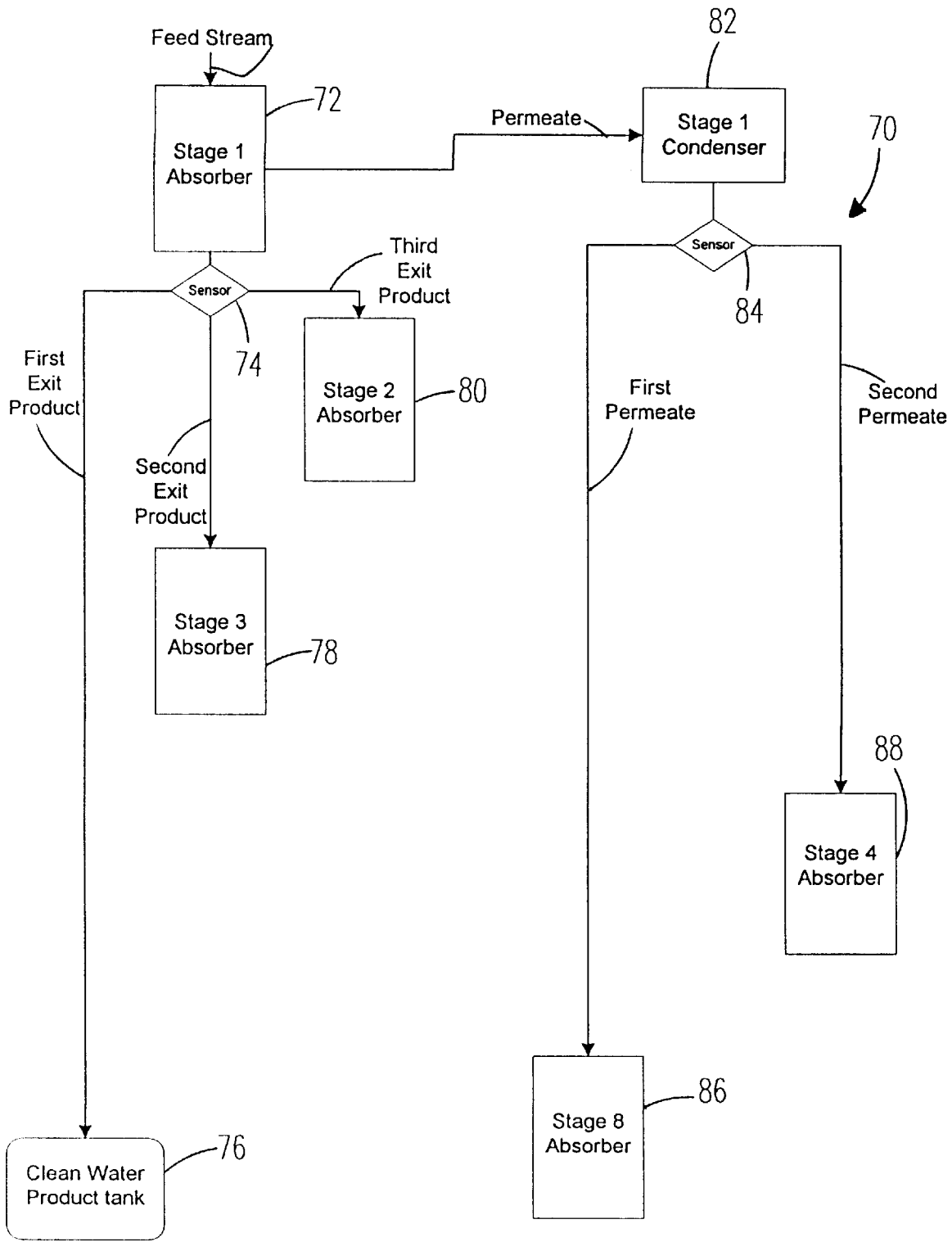
FIG. 16 is one example of a typical commercial system embodying the invention.

Putting these concepts of stages into effect, referring to FIG. 16, one example of a commercial system is shown generally at numeral 70. The feed stream enters a stage 1 absorber 72, the exit stream therefrom being monitored for contamination level at sensor/valve 74. The first exit product will be directed to a clean water product tank 76. When the sensor/valve 74 indicates that the contaminate removal level is declining as after time S in FIG. 15, the exit stream will then be redirected as a second exit product to a stage 3 absorber at 78. When the sensor 74 detects a contaminate concentration level at time T in FIG. 15, the exit stream is again redirected into a stage 2 absorber 80.

The permeate from the stage 1 absorber 72 will be directed into a stage 1 condenser 82. Condensed liquid will pass through sensor 84 which will direct the first permeate having a relatively low level of contamination up to time R as shown in FIG. 15 into, for example a stage 8 absorber 86. At time R, when the concentration of contaminates begins to rise, the second permeate will then be redirected into a stage four absorber 88.

A typical plant or commercial facility of this nature may have between five and fifteen absorber stages, each of which will receive different specified amounts of contaminate concentration for further processing or use as desired.

REGENERATION

Figure 17:
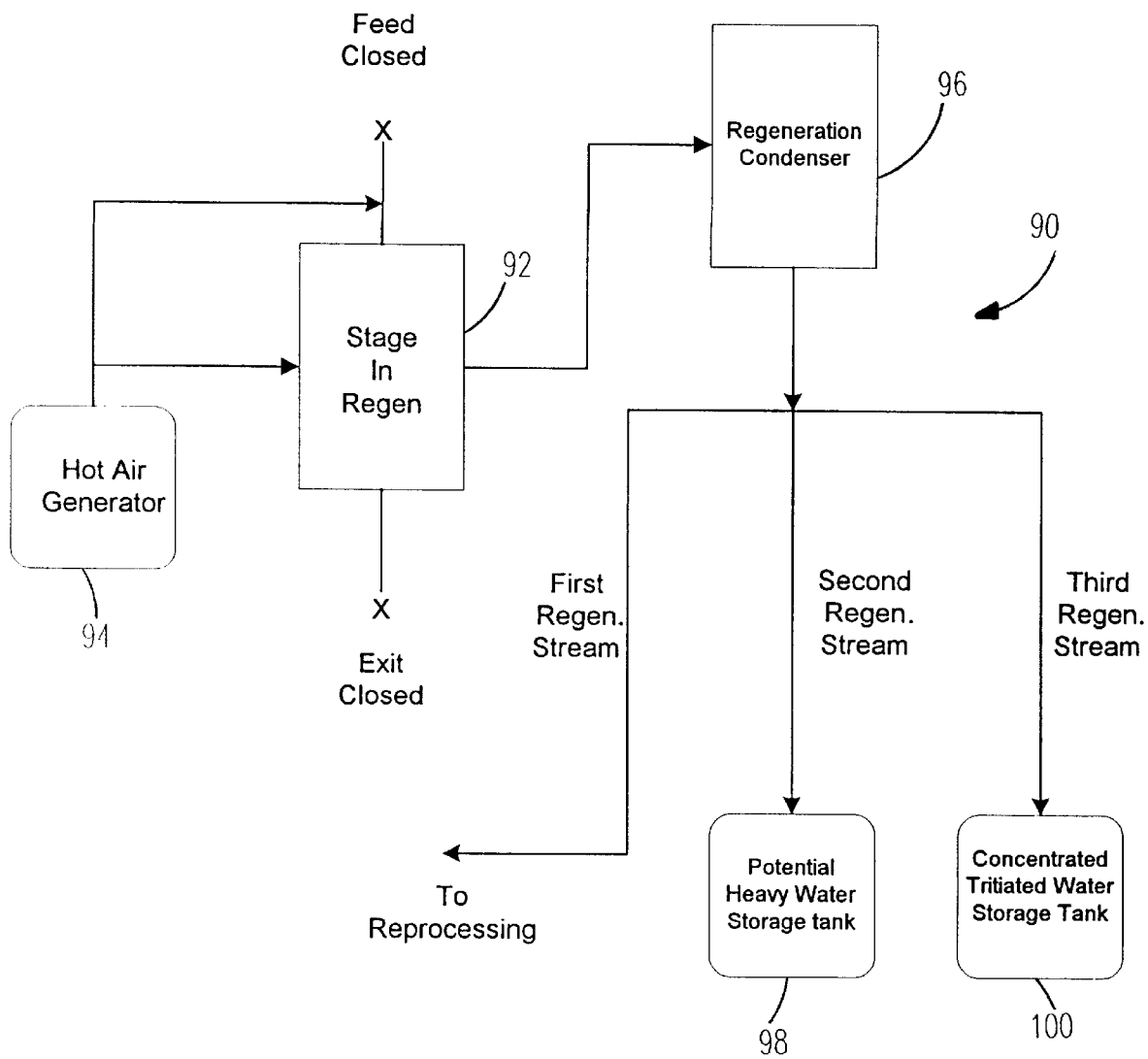
FIG. 17 is an example of a commercial system for regeneration of the contaminate separation apparatus of the invention.

In a typical regeneration process shown in FIG. 17, each stage or module in a typical system like that shown in FIG. 16 is shown typically at numeral 92. During regeneration, the feed and exits are closed and hot air from a hot air generator 94 is directed into the module 92 as shown by the arrows. Hot air flowing through the module 92 will remove the liquid within the exchange resin of each of the hollow core fiber members by releasing waters of hydration H2O, HTO, D2O, and HDO which are carried from the module 92 into a regeneration condenser 96. The liquid condensed and discharging from regeneration condenser 96 during the initial time portion of the regeneration cycle will have the least amount of contaminants in this first regeneration stream and may be returned to the system 70 of FIG. 16 for reprocessing. The second regeneration stream carrying higher amounts of contaminants would be collected at 98, while the third or last regeneration condensate stream would likely be carrying the greatest amount of contaminants such as tritiated water and would be directed to storage tank 100 for appropriate disposal.

To further distinguish the contaminant levels of each of these permeate condensate regeneration streams, the temperature of the air exiting the hot air generator 94 may be gradually increased and/or pressure reduced in steps to provide a greater driving force for contaminant removal.

The regenerated resin and fiber system is returned to the absorption cascade and is rehydrated by the feed stream. The absorption and regeneration cycles are repeated as desired.

Figure 18:
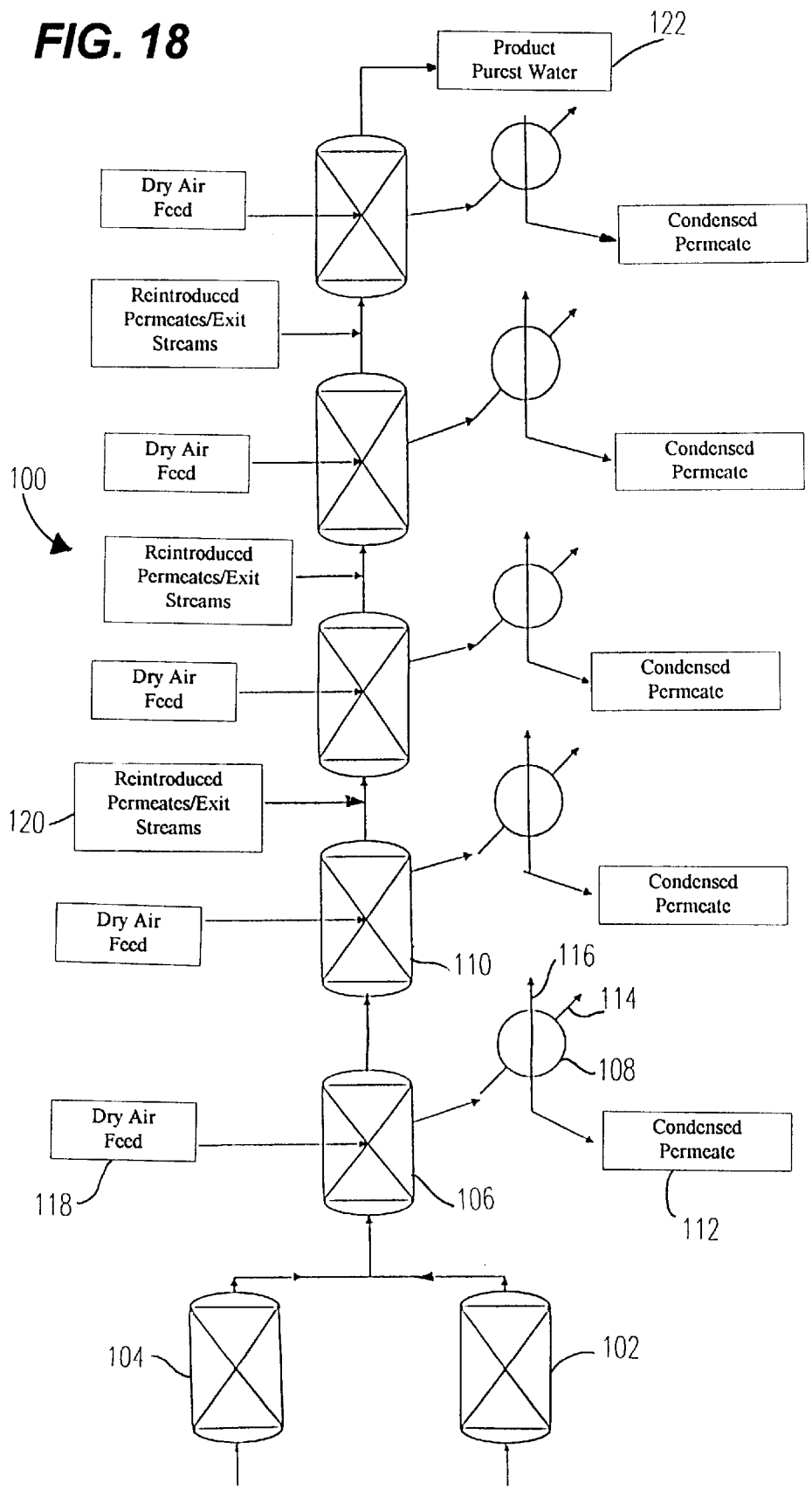
FIG. 18 is a schematic view of a commercial system for both contaminate absorption and sequential regeneration.

Referring lastly to FIG. 18, an overall system for both deuterium and tritium removal from the water contaminated with same is there shown. This system 100 may include prefilters 102 and 104 in the form of either commercial reverse osmosis units or deionization units for pretreating the feed stream entering the stage 1 contaminate separating module 106. Its exit stream enters the stage 2 module 110 and so forth in upward cascade fashion until the final feed stream exits into a container 122 which collects the purest of the processed contaminated water. Permeate from each of the modules is typically collected at condenser 108 and then collected into condensed permeate tank 112 or exiting from 114 or 116 as other stages of contaminated permeate previously described.

Each of the modules may be selectively bypassed as the exit stream contamination level reaches the contamination level of the feed steam for regeneration. Undisconnected from the system 100, a typical hot dry air feed 118 forces hot air directly into each bypass module during the regeneration cycle previuosly described.

To further decontaminate the condensed permeate collecting in each tank 112, it may be reintroduced at 120 into the feed stream between adjacent modules 110 according to the contamination level of the permeate condensate.

While the instant invention has been shown and described herein in what are concieved to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A method of separating heavy isotopes of hydrogen selected from the group consisting of deuterium and tritium in their oxide forms, from contaminated water containing the heavy isotopes comprising the steps of:
   A. permeating substantially light water from the contaminated water outwardly through a wall of a hollow tubular member having a wall pore size sufficient to substantially allow permeation of substantially light water thererough while substantially preventing permeation of heavy isotopes of hydrogen from said hollow tubular member;
   B. absorbing at least a portion of the heavy isotopes of hydrogen with exchange beads packed within said hollow tubular member, said exchange beads including waters of hydration which exchange with and are replaced by said heavy isotopes.

2. A method of separating heavy isotopes of hydrogen in their oxide forms, from contaminated water containing the heavy isotopes comprising the steps of:
   A. flowing contaminated water as an inlet stream into a feed stream inlet of an apparatus for separating the heavy isotopes of hydrogen from the contaminated water, said apparatus comprising:
      an elongated tubular enclosure having a feed stream inlet, an exit stream outlet and a permeate outlet;
      a plurality of elongated hollow core fibers at least a portion of which are partially filled with beads of an exchange resin closely spaced and substantially coextensive within said enclosure between said feed stream inlet and said exit stream outlet;
      said feed stream inlet cooperatively engaged with a first end of said plurality of hollow core fibers such that substantially all of a feed stream of contaminated water flowing into said apparatus through said feed stream inlet flows into said plurality of hollow core fibers;
      said beads absorbing a portion of the heavy isotopes of hydrogen from the contaminated water passing through said plurality of hollow core fibers by exchange of a portion of said heavy isotopes of hydrogen with waters of hydration of said beads;
      said hollow core fibers absorbing another portion of the heavy isotopes of hydrogen by permeation of a portion of the contaminated water outwardly through the walls of said hollow core fibers as a permeate exiting from said apparatus through said permeate outlet and reduced in heavy hydrogen isotopes from that of the feed stream;
      a remainder of contaminated water exiting from said apparatus through said exit stream outlet also being reduced in heavy hydrogen isotope contamination from that of the feed stream,
   B. sensing the amount of heavy hydrogen isotopes in the exit stream;
   C. directing the exit stream for discharge when the amount of heavy hydrogen isotopes is below a predetermined level and when the amount of heavy hydrogen isotopes is above the predetermined level, recycling the exit stream for further heavy hydrogen isotope separation based upon the sensed amount of heavy hydrogen isotopes remaining in the exit stream as determined in Step B.

3. A method as set forth in claim 2, further comprising the steps of:
   D. emptying all contaminated water from said apparatus;
   E. flowing heated air into said apparatus through a regenerating heat inlet in said enclosure at a temperature sufficiently high to release waters of hydration from said beads into said heated air, the heated air exiting from said apparatus through said permeate outlet.

4. A method as set forth in claim 3, further comprising the step of:
   G. flowing heated air into said hollow tubular members through a feed stream inlet in said enclosure at a temperate sufficiently high to release waters of hydration from said beads into the heated air flowing through said hollow tubular members.

5. A method of regenerating an apparatus for separating heavy isotopes of hydrogen in their oxide forms from contaminated water containing the heavy isotopes, said apparatus comprising:
   an elongated tubular enclosure having a feed stream inlet, a regenerating heat inlet, an exit stream outlet and a permeate outlet;
   a plurality of elongated hollow tubular members, at least a portion of which are at least partially filled with beads of an exchange resin closely spaced and substantially coextensive within said enclosure between said feed stream inlet and said exit stream outlet;
   said feed stream inlet cooperatively engaged with a first end of said plurality of hollow tubular members such that substantially all of a feed stream of contaminated water flowing into said apparatus through said feed stream inlet flows into said plurality of hollow tubular members;
   said beads absorbing a portion of the heavy isotopes of hydrogen from the contaminated water passing through said plurality of hollow tubular members by exchange of a portion of said heavy isotopes of hydrogen with waters of hydration of said beads;

said hollow tubular members having a wall pore size sufficient to substantially allow permeation of substantially light water therethrough while substantially preventing permeation of heavy isotopes of hydrogen, whereby another portion of the heavy isotopes of hydrogen are absorbed by said hollow tubular member during permeation of a portion of substantially light water contained within the contaminated water outwardly through the walls of said hollow tubular members, the permeate exiting from said apparatus through said permeate outlet reduced in heavy hydrogen isotopes from that of the feed stream;

a remainder of water exiting from said apparatus through said exit stream outlet also being reduced in heavy hydrogen isotope contamination from that of the feed stream;

said method comprising the steps of:

A. emptying all contaminated water from said apparatus;

B. flowing heated air into said apparatus through a regenerating heat inlet in said enclosure at a temperature sufficiently high to release waters of hydration selected from the group consisting of $H_2O$, $D_2O$, HTO and HDO, from said beads into said heated air, the heated air exiting from said apparatus through said permeate outlet.

6. A method as set forth in claim 5, further comprising the steps of:

C. flowing heated air into said hollow tubular members through said feed stream inlet at a temperature sufficiently high to release waters of hydration from said beads into the heated air flowing through said hollow tubular members.

* * * * *